UNITED STATES PATENT OFFICE.

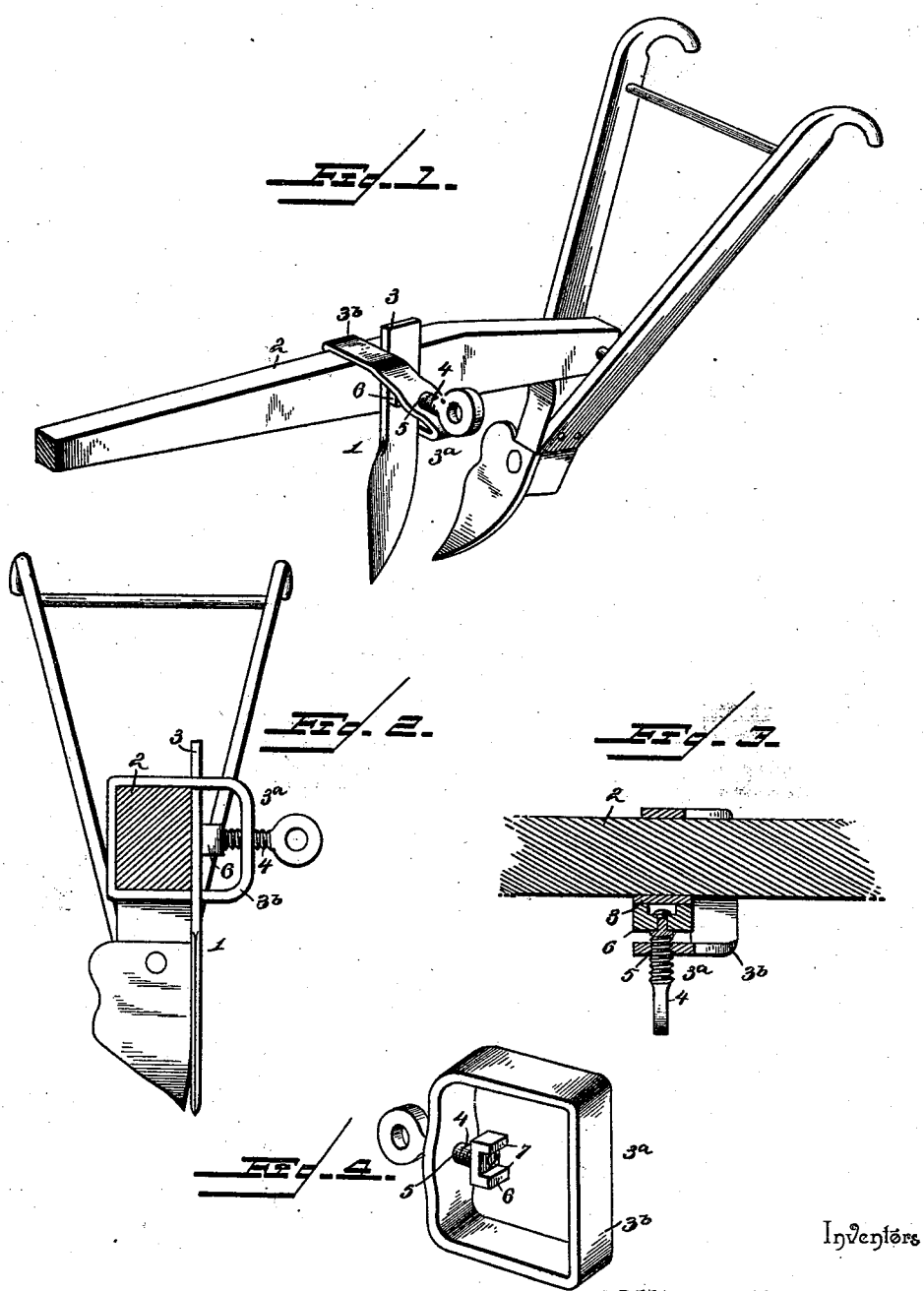

WILLIAM FLOID BRIDGES AND JOHN BUNYAN MIDDLETON, OF PLEASANT HILL, LOUISIANA.

COLTER ATTACHMENT FOR PLOWS.

SPECIFICATION forming part of Letters Patent No. 547,708, dated October 8, 1895.

Application filed June 26, 1895. Serial No. 554,106. (No model.)

*To all whom it may concern:*

Be it known that we, WILLIAM FLOID BRIDGES and JOHN BUNYAN MIDDLETON, citizens of the United States, residing at Pleasant Hill, in the parish of Sabine and State of Louisiana, have invented a new and useful Colter Attachment for Plows, of which the following is a specification.

The invention relates to improvements in colter attachments for plows.

The object of the present invention is to provide a simple and inexpensive clamp, possessing great strength and durability and capable of enabling a colter to be readily applied to the beam of a plow and to be adjusted to position it properly with relation to the plow-point.

The invention consists in the construction and novel combination and arrangement of parts hereinafter fully described, illustrated in the accompanying drawings, and pointed out in the claim hereto appended.

In the drawings, Figure 1 is a perspective view of a colter attachment constructed in accordance with this invention and shown applied to a plow. Fig. 2 is a transverse sectional view. Fig. 3 is a horizontal sectional view. Fig. 4 is a detail perspective view of the clamp.

Like numerals of reference designate corresponding parts in all the figures of the drawings.

1 designates a colter depending from a plow-beam 2 in the usual manner and provided with a shank 3, arranged vertically on the plow-beam and secured thereto by a clamp 3ª, comprising a substantially rectangular frame, which receives the plow-beam and the shank of the collar, and a horizontally-disposed screw 4, arranged in a threaded opening of the side 5 of the frame and having its inner end swiveled to a block 6, engaging a shank of the colter.

The frame 3ᵇ is arranged at an inclination on the plow-beam, and the vertical shank passes through the frame and has its front edge bearing against the top of the same and its rear edge supported by the bottom thereof. The side 4 of the frame is bowed outward slightly, and the block 6 is disposed horizontally and is provided at its ends with lugs 7, which bear against the outer face of the shank of the colter and securely hold the same at the desired adjustment. The block 6 is provided between the lugs 7 with a perforation to receive the inner end of the screw, and the outer end of the latter is provided with a head.

The clamp is adapted to be arranged on the beam at the desired point, and the clamping-screw and the block 6 secure the colter within the frame and enable it to be raised or lowered to arrange it in proper relation with the plow-point.

It will be seen that the attachment is simple and inexpensive in construction; that it enables a colter to be quickly applied to a plow-beam and readily adjusted and secured in the desired position, and that the plow-beam is not weakened by perforations or bolt-holes.

Changes in the form, proportion, and minor details of construction may be resorted to without departing from the spirit or sacrificing any of the advantages of this invention.

What we claim is—

The combination with a plow-beam, of a substantially rectangular frame receiving the plow-beam and disposed at an inclination, and having one side bowed outward and provided with a threaded opening, a colter having the shank arranged in the frame and bearing against the top and bottom thereof, a screw disposed horizontally and arranged in the threaded perforation of the frame, and the block swiveled to the inner end of the screw, and provided with lugs engaging the shank of the colter, substantially as described.

In testimony that we claim the foregoing as our own we have hereto affixed our signatures in the presence of two witnesses.

WILLIAM FLOID BRIDGES.
JOHN BUNYAN MIDDLETON.

Witnesses:
A. A. ZACHORY,
GEO. SIMMONS.